(12) United States Patent
Vasseur et al.

(10) Patent No.: US 12,010,017 B2
(45) Date of Patent: Jun. 11, 2024

(54) ROUTING ONLINE APPLICATION TRAFFIC BASED ON PATH FATE SHARING METRICS

(71) Applicant: Cisco Technology, Inc., San Jose, CA (US)

(72) Inventors: Jean-Philippe Vasseur, Saint Martin d'Uriage (FR); Eduard Schornig, Haarlem (NL); Vinay Kumar Kolar, San Jose, CA (US); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 17/533,649

(22) Filed: Nov. 23, 2021

(65) Prior Publication Data
US 2023/0171190 A1    Jun. 1, 2023

(51) Int. Cl.
| | | |
|---|---|---|
| H04L 45/00 | (2022.01) | |
| H04L 41/5019 | (2022.01) | |
| H04L 43/045 | (2022.01) | |
| H04L 43/08 | (2022.01) | |
| H04L 43/16 | (2022.01) | |
| H04L 45/02 | (2022.01) | |
| H04L 47/125 | (2022.01) | |

(52) U.S. Cl.
CPC .......... *H04L 45/70* (2013.01); *H04L 41/5019* (2013.01); *H04L 43/045* (2013.01); *H04L 43/08* (2013.01); *H04L 43/16* (2013.01); *H04L 45/08* (2013.01); *H04L 47/125* (2013.01)

(58) Field of Classification Search
CPC ..... H04L 45/08; H04L 45/123; H04L 45/302; H04L 45/306; H04L 45/22; H04L 45/24; H04L 45/70; H04L 41/5009; H04L 41/5019; H04L 43/045; H04L 43/55; H04L 43/08; H04L 43/16; H04L 43/20; H04L 47/125
See application file for complete search history.

(56) References Cited

U.S. PATENT DOCUMENTS

| | | |
|---|---|---|
| 6,928,472 B1 | 8/2005 | Wen |
| 7,388,841 B2 | 6/2008 | Shao et al. |
| 8,954,582 B2 | 2/2015 | Vasseur et al. |
| 9,432,248 B2 | 8/2016 | Vasseur et al. |
| 9,774,522 B2 | 9/2017 | Vasseur et al. |
| 9,838,279 B2 | 12/2017 | Ogielski et al. |
| 11,637,753 B1* | 4/2023 | Wang ................ H04L 41/147 709/223 |
| 2002/0145981 A1* | 10/2002 | Klinker ............. H04L 45/124 370/244 |
| 2006/0176809 A1* | 8/2006 | Lea .................. H04L 47/125 370/395.21 |
| 2017/0012848 A1* | 1/2017 | Zhao ................... H04L 43/04 |

* cited by examiner

*Primary Examiner* — Mohamed A Kamara
(74) *Attorney, Agent, or Firm* — BEHMKE INNOVATION GROUP LLC; James M. Behmke; James J. Wong

(57) ABSTRACT

In one embodiment, a device identifies a plurality of paths between a pair of network addresses, wherein one of the pair of network addresses is associated with an online application. The device obtains telemetry data from the plurality of paths for the online application. The device computes, based on the telemetry data, fate sharing metrics for the plurality of paths. The device controls routing of application traffic between the pair of network addresses, based on the fate sharing metrics for the plurality of paths.

20 Claims, 11 Drawing Sheets

ROUTING ONLINE APPLICATION TRAFFIC BASED ON PATH FATE SHARING METRICS

TECHNICAL FIELD

The present disclosure relates generally to computer networks, and, more particularly, to routing online application traffic based on path fate sharing metrics.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Unfortunately, SD-WAN deployments are complex networks that are rarely understood in their entirety, making path fate sharing intractable. Manual policy routing may be applied so as to select a series of service providers that have a lower risk of fate sharing. However, an approach is also extremely random in its results, unreliable, and, in many cases, simply not practical.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
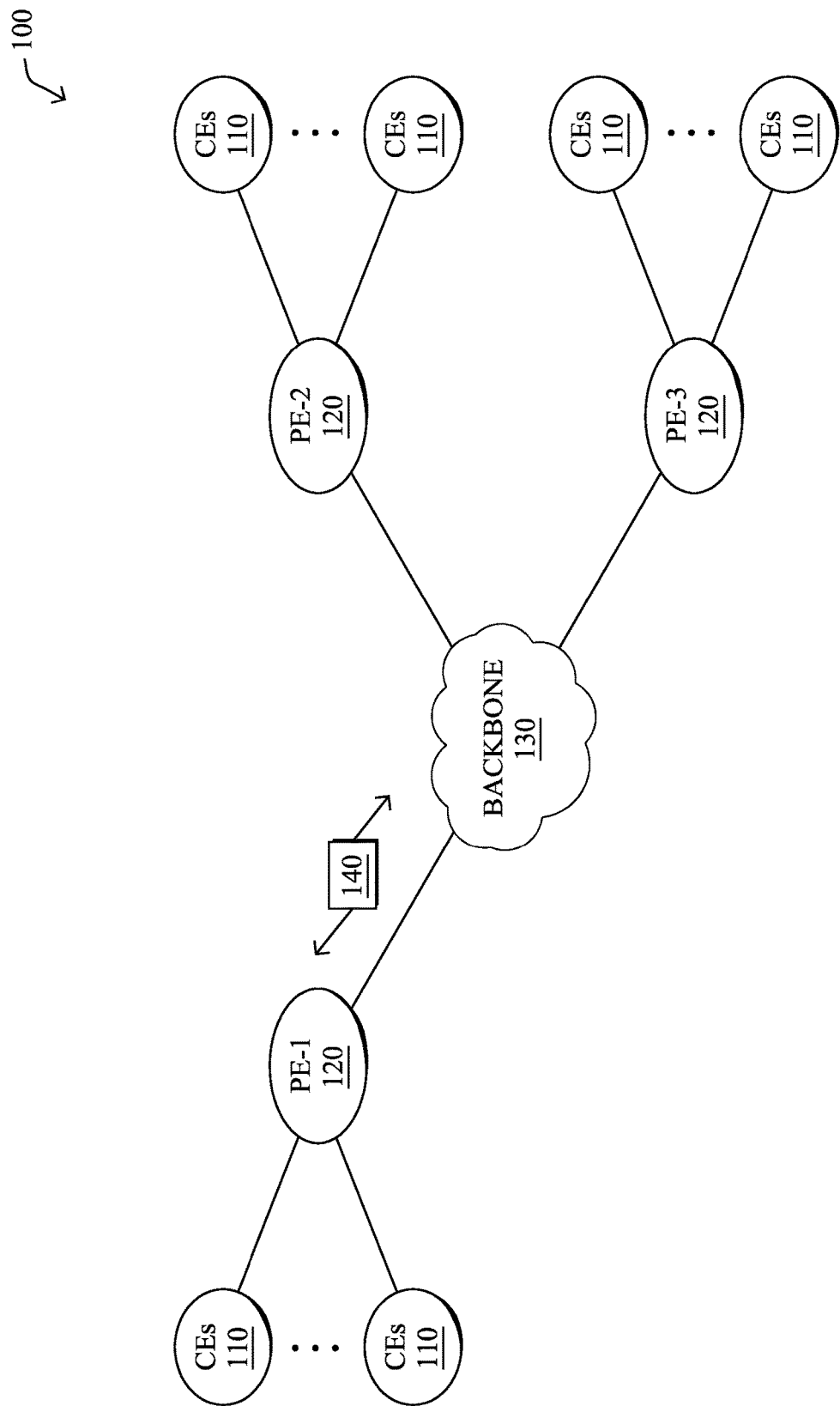
FIGS. 1A-1B illustrate an example communication network.

According to one or more embodiments of the disclosure, a device identifies a plurality of paths between a pair of network addresses, wherein one of the pair of network addresses is associated with an online application. The device obtains telemetry data from the plurality of paths for the online application. The device computes, based on the telemetry data, fate sharing metrics for the plurality of paths. The device controls routing of application traffic between the pair of network addresses, based on the fate sharing metrics for the plurality of paths.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
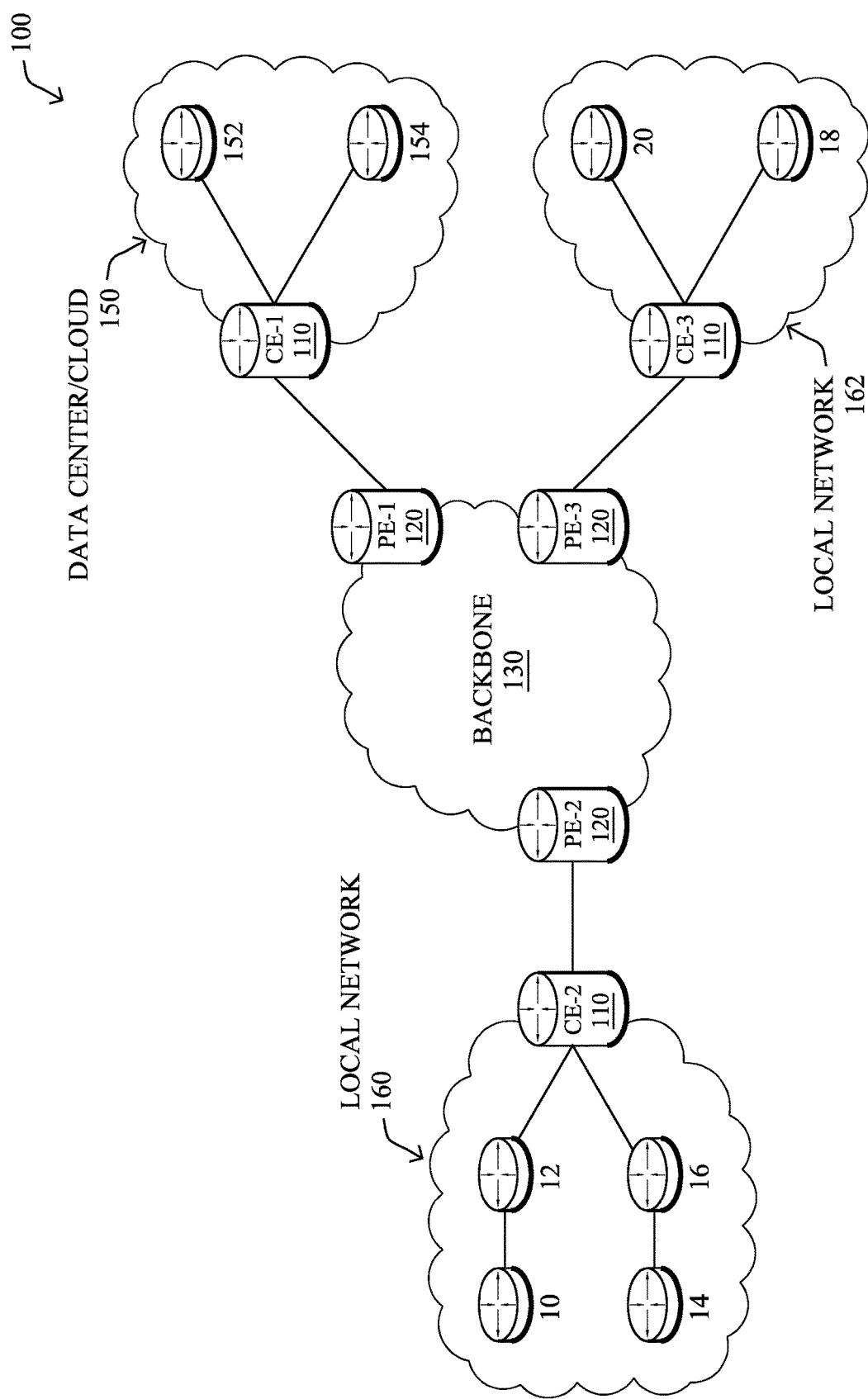

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
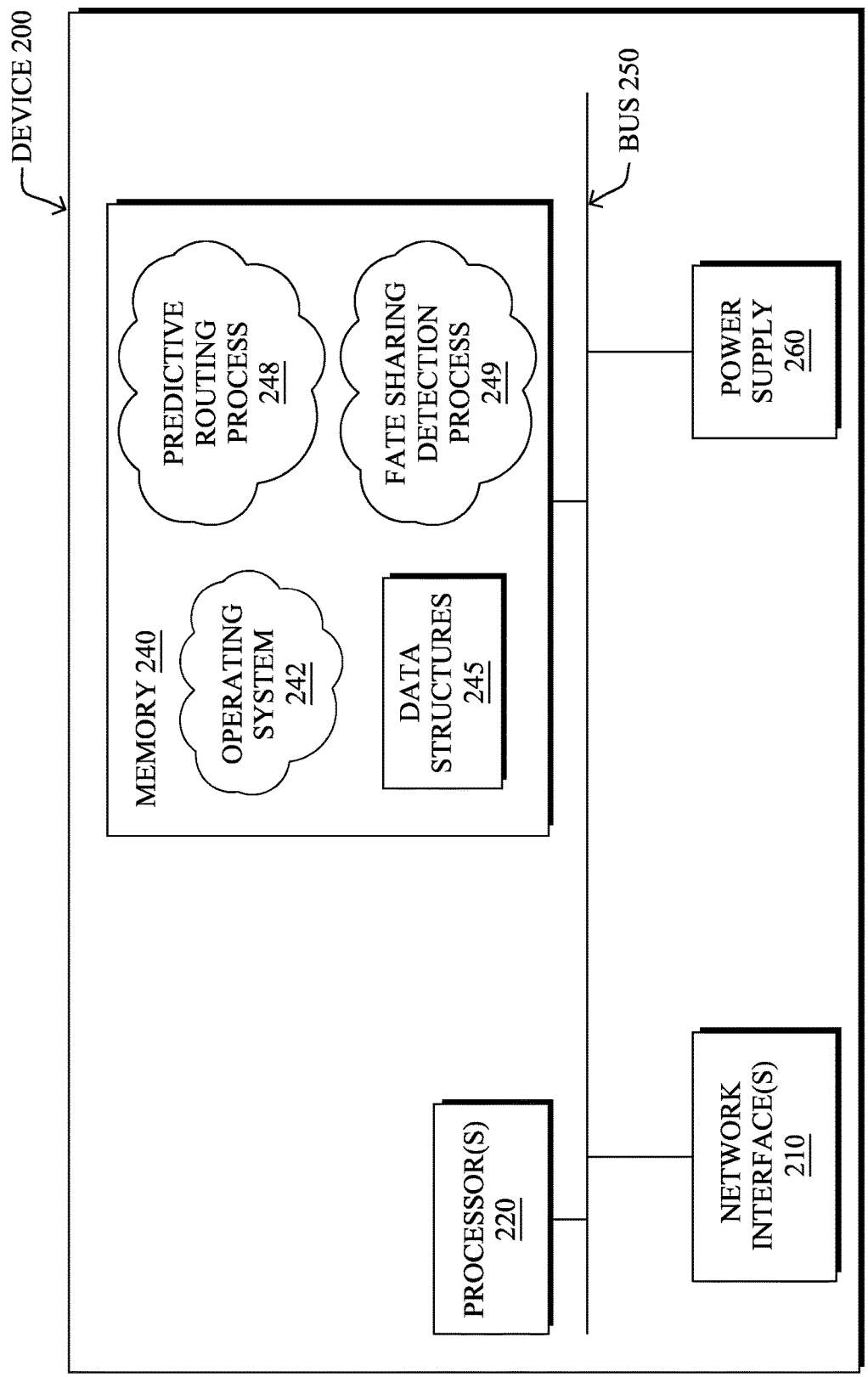
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a fate sharing detection process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or fate sharing detection process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or fate sharing detection process 249 may include computer executable instructions that, when executed by processor(s) 220, cause device 200 to perform the techniques described herein. To do so, in some embodiments, predictive routing process 248 and/or fate sharing detection process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or fate sharing detection process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or fate sharing detection process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
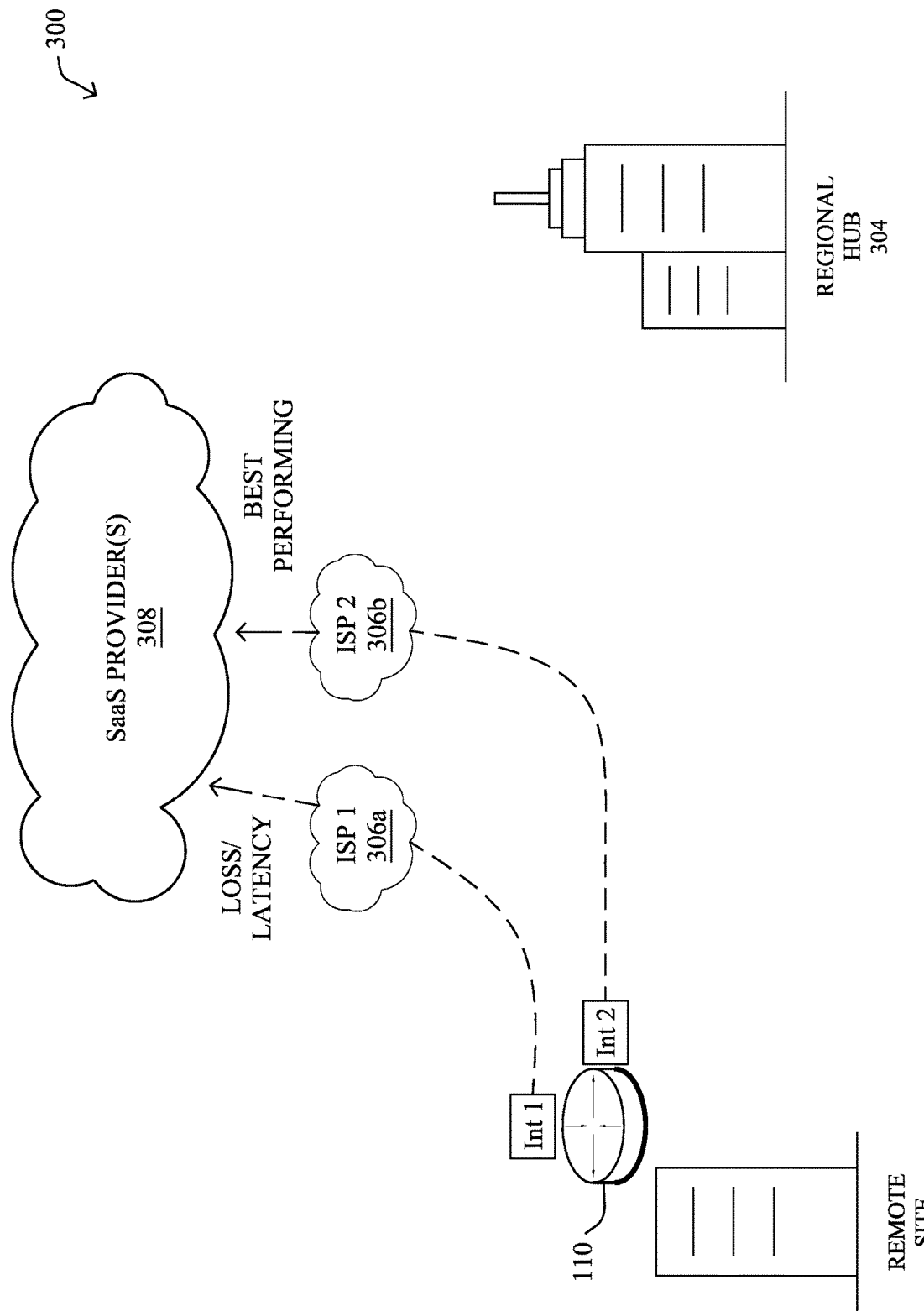
FIGS. 3A-3B illustrate example network deployments.
Figure 3B:
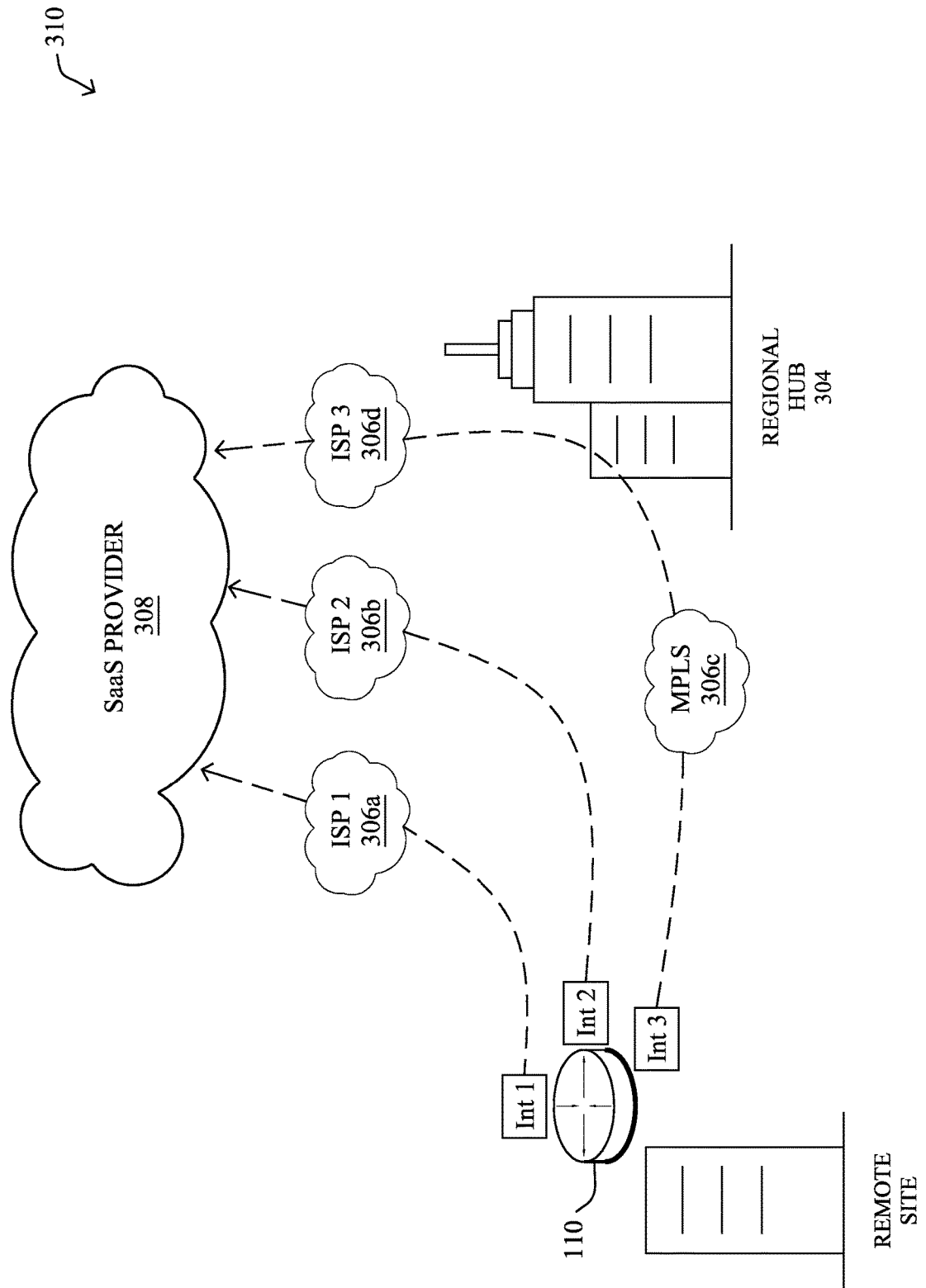

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
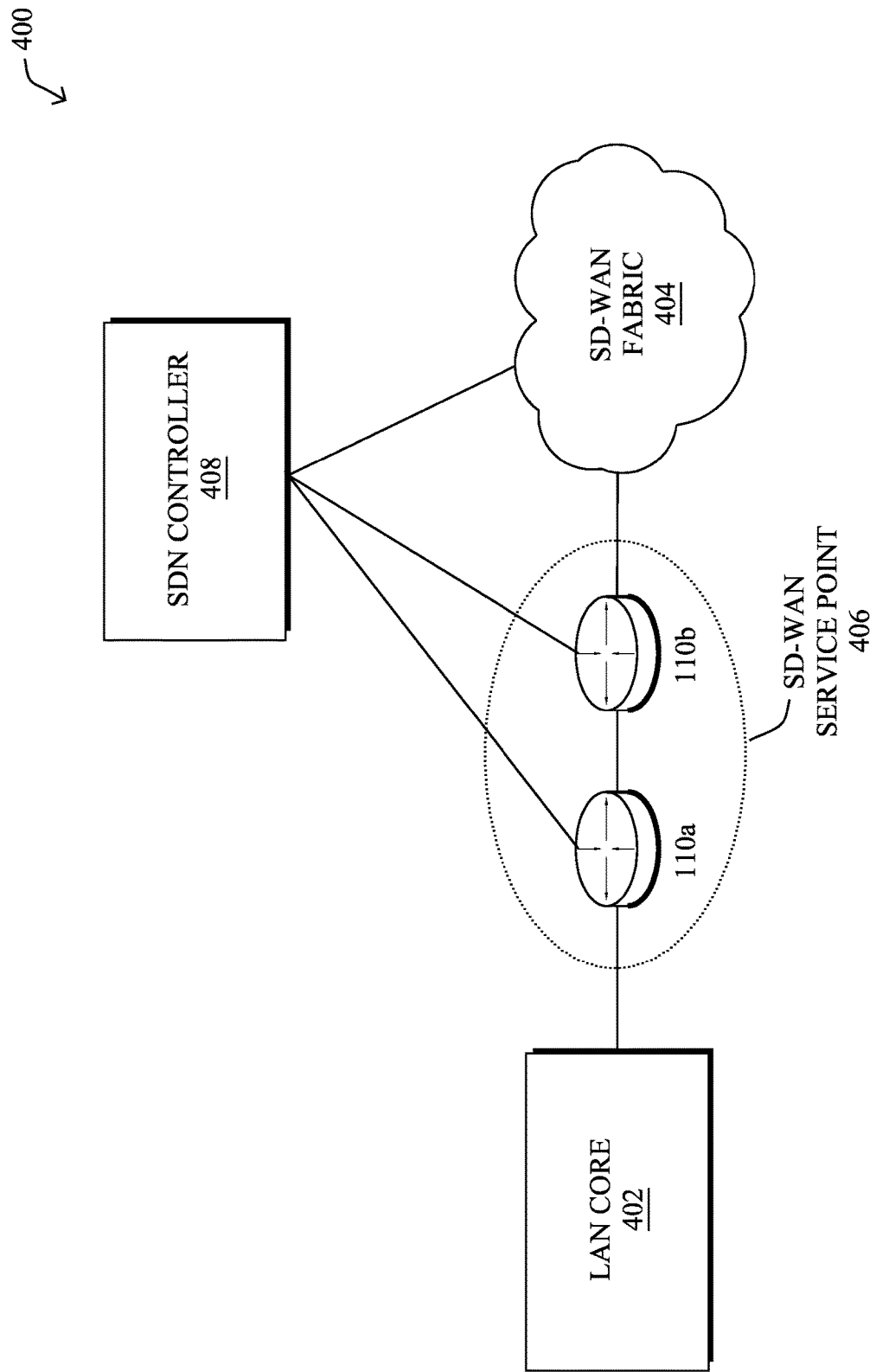
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
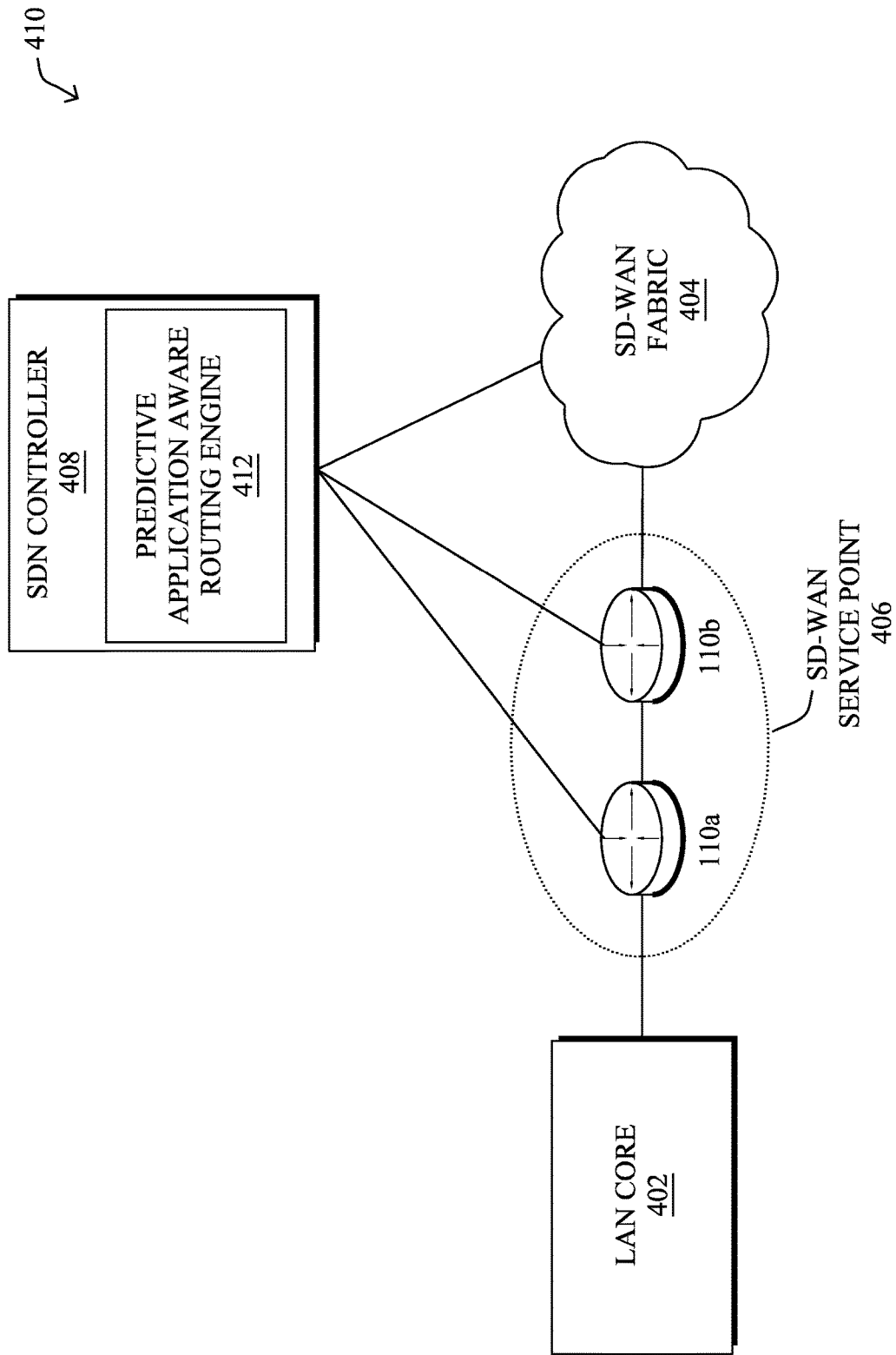

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application (e.g., via an API, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiting highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, identifying fate sharing conditions among network paths can help to aid in ensuring acceptable application experience for an online application. However, doing so is becoming increasingly challenging for network administrators as critical applications move to public cloud environments or are delivered in a SaaS model causing the network perimeter to expand.

Traditionally, many protection mechanisms such as optical 1:1 and 1+1 heavily rely on the ability to find diverse paths so that a single failure cannot impact both the primary and the secondary path at the same time. MPLS Traffic Engineering path protection made use of similar approach, either by using a 2-step approach or simultaneous computation of diverse path. Indeed, the 2-step approach would lead to many situations where no solution can be found although a solution exists especially in presence of bandwidth constraint).

The most common solution to fate sharing has been to carry out a link (e.g., IP) attribute so as to reflect the underlying topology. For example, Shared Link Risk Group (SRLG) is a link attribute manually set by a user to reflect lower layer topology. Two links sharing the same SRLG are thus sharing a common resource (e.g., lambda) whose failure would simultaneously impact both links. This allows for protection mechanisms to improve the degree of diversity by avoiding SRLG (usually at extra-cost). More advanced options have been made to signal via UNI such as SRLG. For IGP, probes have been captured so as to perform correlation of events reflecting simultaneous failures thus revealing some level of fate sharing.

For paths crossing the Internet, such as over an SD-WAN, fate sharing among paths becomes intractable. To address this, manual policies are sometimes defined, to utilize service providers that have a lower risk of exhibiting fate sharing. However, this approach is also extremely random in its results, is often unreliable, and, in many cases, not even feasible.

Routing Online Application Traffic Based on Fate Sharing Metrics

The techniques introduced herein allow for the dynamic computation of fate sharing metrics across different network paths, to control routing decisions for application traffic. In some aspects, the techniques herein allow a network administrator to simply specify a pair of nodes/addresses or set of application(s) of interest. For each node/application of interest, several metrics may be retrieved reflecting the traffic experience along such paths and used to determine their degree of fate sharing. In further aspects, on detecting a sufficiently high degree of fate sharing among paths, remediation actions can be taken, such as by informing the network administrator or employing a closed-loop control mechanism, to adapt the routing of the application traffic. For instance, in some aspects, the application traffic could be load balanced using paths with low fate sharing. Doing so helps to reduce the impact of any single failure on the application experience, while allowing for a tradeoff to be made between the degree of path diversity and overall application performance.

Illustratively, the techniques described herein may be performed by hardware, software, and/or firmware, such as in accordance with fate sharing detection process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device identifies a plurality of paths between a pair of network addresses, wherein one of the pair of network addresses is associated with an online application. The device obtains telemetry data from the plurality of paths for the online application. The device computes, based on the telemetry data, fate sharing metrics for the plurality of paths. The device controls routing of application traffic between the pair of network addresses, based on the fate sharing metrics for the plurality of paths.

Figure 5:
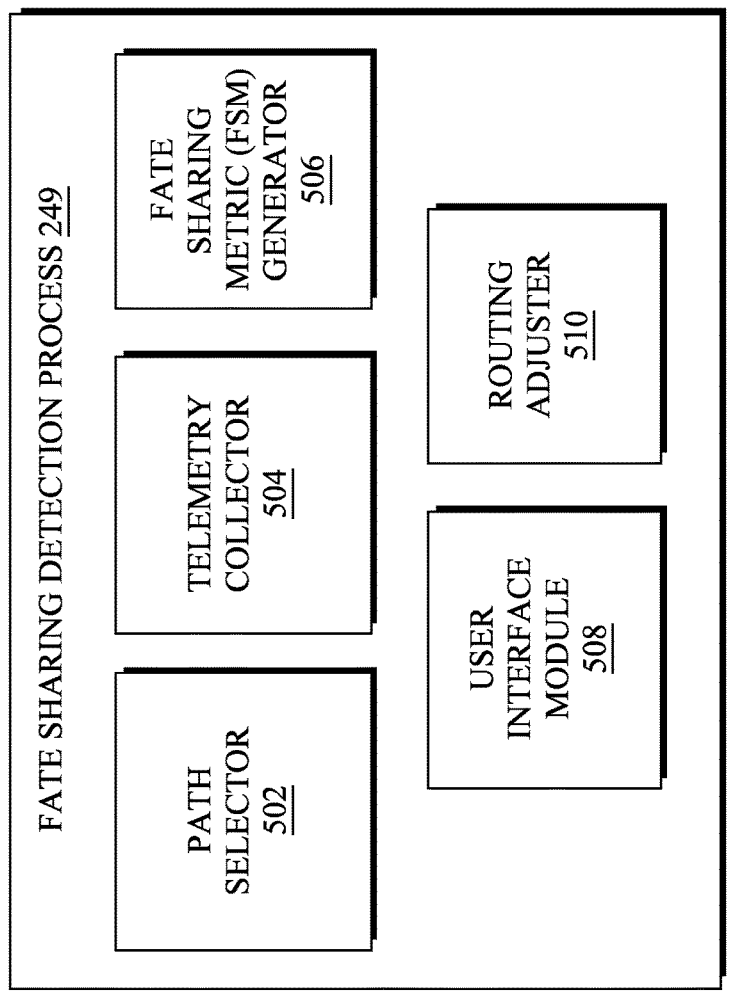
FIG. 5 illustrates an example architecture for assessing fate sharing among network paths.

Operationally, FIG. 5 illustrates an example architecture for assessing fate sharing among network paths, according to various embodiments. At the core of architecture 500 is fate sharing detection process 249, which may be executed by a controller for a network or another device in communication therewith. For instance, fate sharing detection process 249 may be executed by a controller for a network (e.g., SDN controller 408 in FIGS. 4A-4B), a particular networking device in the network (e.g., a router, etc.), another device or service in communication therewith, or the like. In some embodiments, for instance, fate sharing detection process 249 may be used to implement a predictive application aware routing engine, such as predictive application aware routing engine 412, or another supervisory service for the network.

As shown, fate sharing detection process 249 may include any or all of the following components: a path selector 502, a telemetry collector 504, a fate sharing metric (FSM) generator 506, a user interface module 508, and/or a routing adjuster 510. As would be appreciated, the functionalities of these components may be combined or omitted, as desired. In addition, these components may be implemented on a singular device or in a distributed manner, in which case the combination of executing devices can be viewed as their own singular device for purposes of executing fate sharing detection process 249.

During execution, path selector 502 may be operable to identify a plurality of network paths that should be analyzed by fate sharing detection process 249, in various embodiments. In some embodiments, path selector 502 may do so based in part on user input received via user interface module 508. For instance, a user may specify a set of critical destinations (e.g., data centers hosting critical online applications) towards which many other sites connect using a set of paths (e.g., with load balancing). In yet another example, paths between data centers exchanging a high volume of data may be of high interest and the user may explicitly specify a pair of IP addresses. In either case, the main objective of path selector 502 is to identify the paths between two addresses, such as an end-user site and a SaaS application.

Control over which paths are selected/identified by path selector 502 may also be based on other parameters, as well. For instance, in one embodiment, path selector 502 may identify paths based on those paths being associated with a particular online application (e.g., Office 365, a voice-related application, etc.). In another embodiment, path selector 502 may also base its selection on the volume of application traffic conveyed by those paths. In other words, path selector 502 may only select paths for the fate sharing analysis between two addresses, if those paths convey at least a threshold volume of traffic for that application.

In some embodiments, such as in the case of SD-WANs, path selector 502 may also need to perform path discovery, to identify all of the paths between to addresses to analyze. For instance, if a pair of edges is of interest (e.g., based on their application traffic, traffic volumes, etc.), then path selector 502 may determine the number of paths available between those pairs. Consider the case of a remote device E and a central Hub H in an SD-WAN. In such a case, path selector 502 may dynamically discover the list of paths between these sites by inspecting the routing information base (RIB) on edge E. Each path between E and H is then added by path selector 502 to the list of paths for analysis.

In various embodiments, telemetry collector 504 may be responsible for obtaining telemetry data for all of the paths selected/identified by path selector 502. Such telemetry data may comprise end-to-end path metrics reflecting the path performance characteristics of a given path, such as its delay, loss, jitter, etc., from which fate sharing among the paths can be inferred. This can be done either on a pull basis in which telemetry collector 504 requests the collection of this information from one or more nodes along the paths or on a push basis in which telemetry collection nodes simply provide their collected telemetry to telemetry collector 504 without first receiving a request to do so. Telemetry collector 504 may also normalize any telemetry data obtained from the various paths (e.g., via BFD probes for an end-to-end tunnel, HTTP probes, etc.).

Fate sharing metric (FSM) generator 506 may be configured to compute fate sharing metrics between the different paths identified by path selector 502, according to various embodiments. In a simple case, FSM generator 506 may compute the fate sharing metrics directly from the telemetry data collected by telemetry collector 504. However, in other embodiments, FSM generator 506 may base the fate sharing metrics in whole, or in part, on metrics derived therefrom. For instance, in one embodiment, FSM generator 506 may base its fate sharing metrics on SLA violations along the paths for the online application. In another embodiment, FSM generator 506 may base its fate sharing metrics on SLA violations that are predicted by a machine learning model to occur along the paths (e.g., using the prediction mechanism of predictive routing process 248), such as for the percentage of time the SLA is predicted to be violated.

In general, a fate sharing metric generated by FSM generator 506 reflects the degree of fate sharing between a set of n paths for a pair of IP addresses. Such metrics may, for instance, indicate how often the paths are likely to provide acceptable or unacceptable application experience during any given time period.

It is also important to note that the fate sharing metrics computed by FSM generator 506 may be for each pair of IP addresses, a well as potentially on a per-application basis. Indeed, different application flows may follow different paths between a pair of nodes, especially in the presence of load balancing. In this case, the path metrics are used as proxy for the path being used between the pair of nodes.

Figure 6:
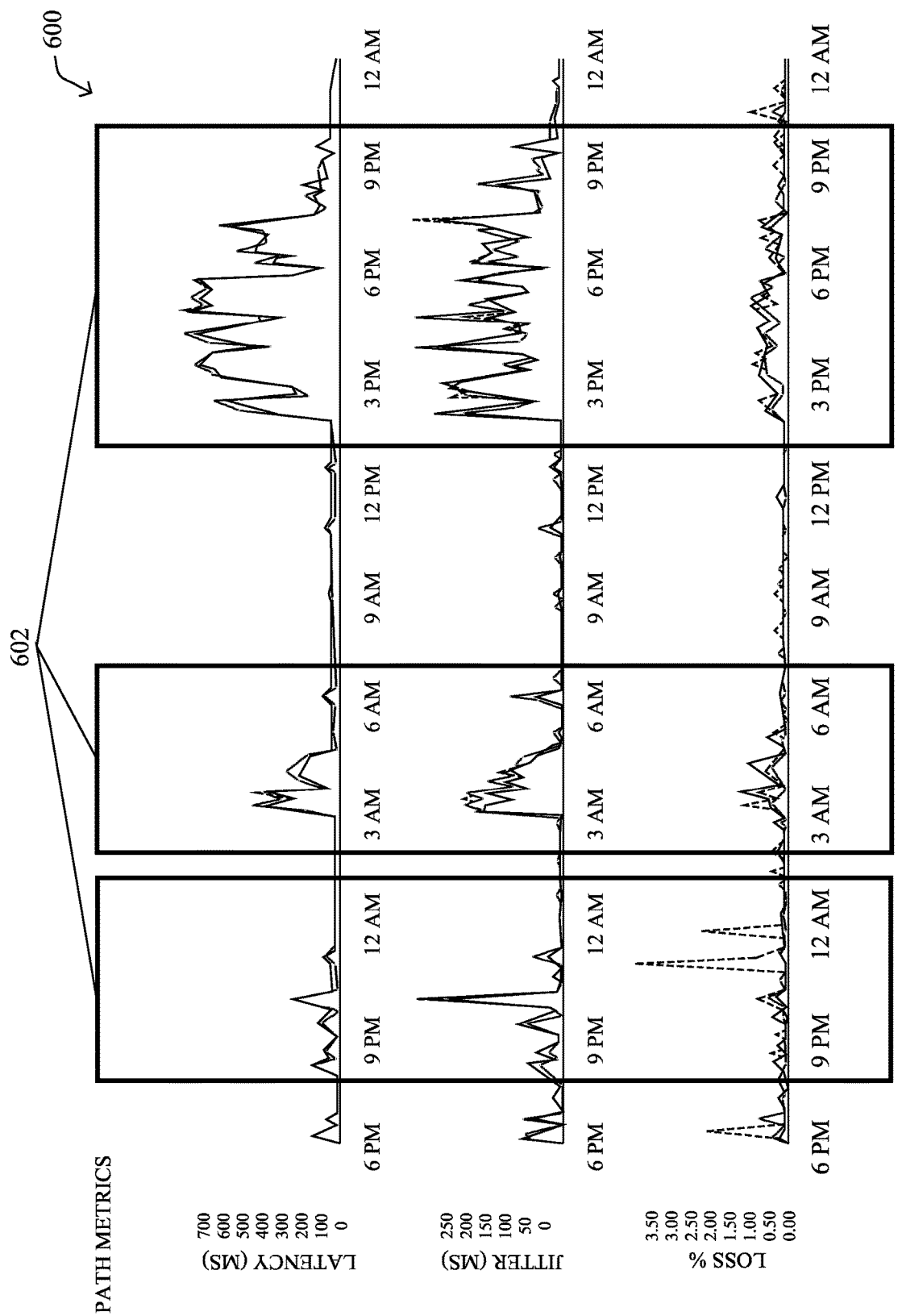
FIG. 6 illustrates an example plot of path metrics indicating fate sharing.

One way for FSM generator 506 to compute the fate sharing metrics between the paths is to use correlation coefficients for the metrics. For instance, FIG. 6 illustrates an example plot 600 of path metrics indicating fate sharing. More specifically, assume that the fate sharing metric is computed based on the percentage of time that two paths jointly exhibit SLA violations for the application. Time periods 602 reflect such behaviors across the measured latency, jitter, and loss along the paths, indicating that the paths are exhibiting fate sharing behaviors. In this case, also assume that the probability of SLA violations correlates almost perfectly, as well, indicating a very high degree of fate sharing.

Note that two paths P1 and P2 with high degree of fate sharing may not ALWAYS have underlying metrics with high degree of correlation, simply because paths do change within the Internet and the metric may not always be a perfect proxy. For example, if the probability of an SLA violation is used to compute the fate sharing metrics, two paths may be at the border of an SLA violation. This can lead to one path having a predicted SLA violation and the other path not having a predicted SLA violation, leading to a low correlation between their predictions. So, even if they share the same fate, their respective metric may not perfectly correlate. Still, if there exists some period of time during which correlation is high then the fate sharing metric should be adjusted, accordingly.

Referring again to FIG. 5, FSM generator 506 may also construct a correlation matrix can be constructed between all the time-series for the paths. For example, time-series of QoS metric like loss, jitter, latency, etc. for all paths may be considered for all fate sharing paths. Then, FSM generator 506 may compute the correlation coefficient, such as Pearson's, Kendall's, or Spearman's correlation coefficient, between all pairs of time-series. Such a matrix provides all pairs of paths that have high correlation.

Figure 7:
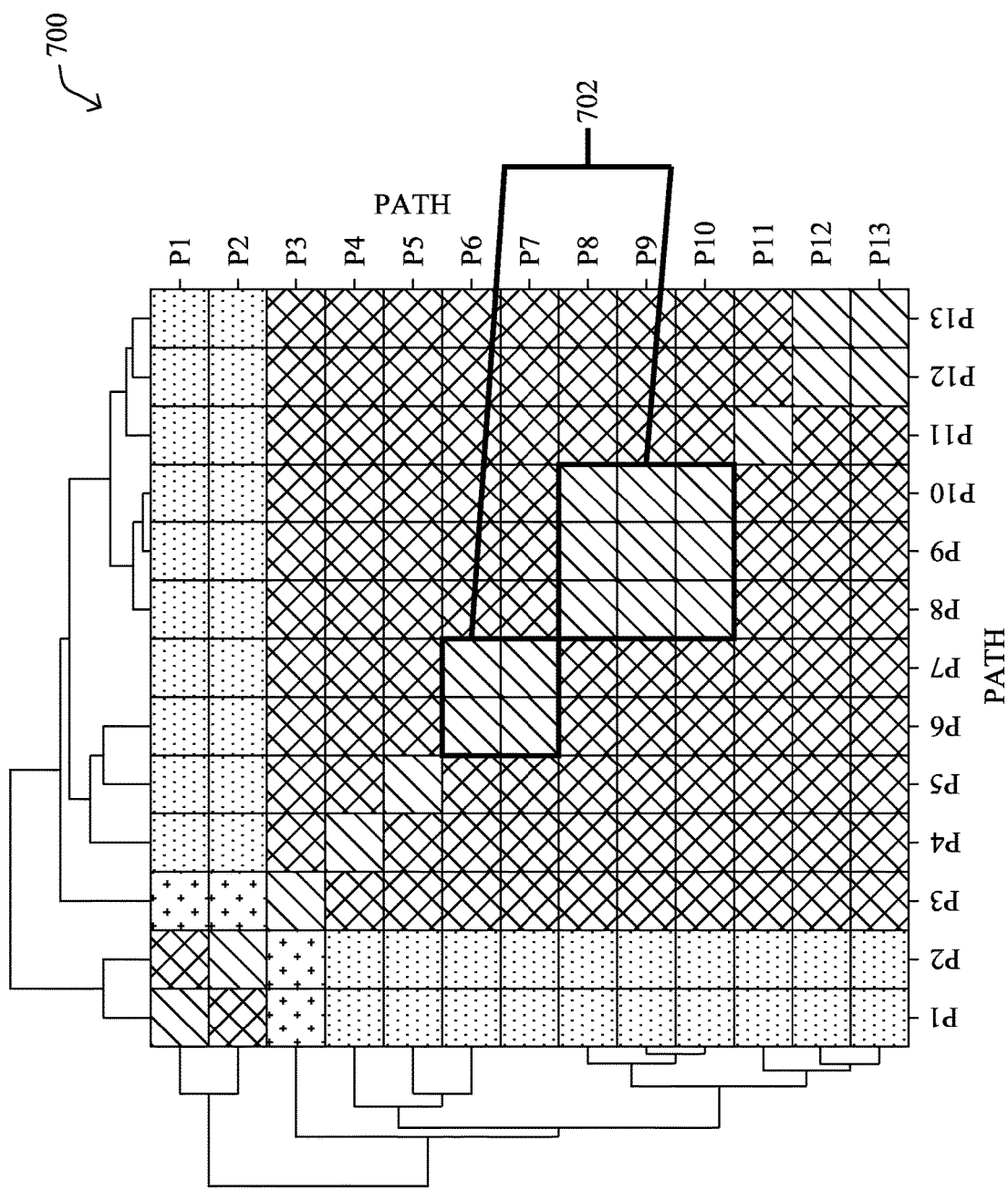
FIG. 7 illustrates an example correlation matrix showing fate sharing paths.

FIG. 7 illustrates an example correlation matrix 700 showing fate sharing paths, according to various embodiments. More specifically, correlation matrix 700 shows the correlation coefficients between a pair of paths for a given QoS metric. In some embodiments, FSM generator 506 may also perform time-series clustering, such as by using clustermap or another clustering approach, to detect strong clusters of paths that have a high correlation. This allows FSM generator 506 to identify paths that have similar QoS time-series, such as those associated with clusters 702 shown. In other instances, each time-series can be considered as a vector by FSM generator 506, which then applies dimensionality reduction to the vectors (e.g., using principal component analysis, t-sne, auto-encoders, etc.), to first reduce their dimensionality. In turn, FSM generator 506 may then apply a clustering algorithm such as DBSCAN or k-means, to form the clusters.

The above embodiments introduce ways to cluster against a single QoS metric, resulting in clusters of paths where there is fate sharing according to only that single QoS metric. However, in further embodiments, this can be generalized to compute fate sharing metrics for a set of QoS metrics or other metrics (e.g., predicted or observed SLA violations, etc.). To generalize across multiple user selected metrics, FSM generator 506 may iteratively compute correlation for each metric, and then a select the set of paths which share fate across all majority of the metrics.

User interface module 508 may be configured to allow a user, such as a network administrator, to interact with fate sharing detection process 249. For instance, in some embodiments, user interface module 508 may be responsible for providing indications of the fate sharing metrics for the identified paths for display to the user. This can be done, in some cases, when the degree of fate sharing has crossed some thresholds for some path of interest (e.g., between some pair of edges, for some interesting traffic, etc.). Said differently, user interface module 508 may notify the user that a pair of paths do have strong fate sharing.

User interface module 508 may also provide additional contextual information for display to a user, as well. For example, trace route may be triggered on the fly upon detecting a high value for a fate sharing metric, in order to discover the shared nodes/AS in the Internet (e.g., although the first two hops are AS from different SP, they share the same route (AS) towards a given destination). Such information may advantageously be utilized by the user in order to increase the degree of diversity of Internet paths in their network.

According to various embodiments, fate sharing detection process 249 may also include routing adjuster 510, which controls the routing of application traffic via the identified paths, based on their fate sharing metrics. This can be done either automatically or in response to a request from a user via user interface module 508. In some embodiments, the routing decisions by routing adjuster 510 may entail load balancing the application across paths having low or no fate sharing.

For example, if three paths exist between a pair of nodes, routing adjuster 510 may decide to load balance traffic between the subset of paths that exhibit low fate sharing metrics. Thus, instead of load balancing traffic between P1, P2 and P3, for example, the system may choose to load balance between the one of the three possibilities (P1,P2), (P2,P3) or (P1, P3) if their fate sharing metrics are below a given value, so as to minimize the impact of any single-point failures for the traffic between two nodes.

Note that any load balancing by routing adjuster 510 may reduce the number of paths over which the application traffic is sent, thus reducing the overall throughput. In some embodiments, routing adjuster 510 may also take this into account and perform a tradeoff between using fewer paths and increase the risk of impact of a single failure. To this end, routing adjuster 510 may also monitor the impact on application QoE while using fewer paths, in order to meet the diversity constraint (e.g., lower fate sharing). If the application QoE degrades, then routing adjuster 510 may relax the constraint of using fewer paths at the risk of increasing the impact of a single failure.

Figure 8:
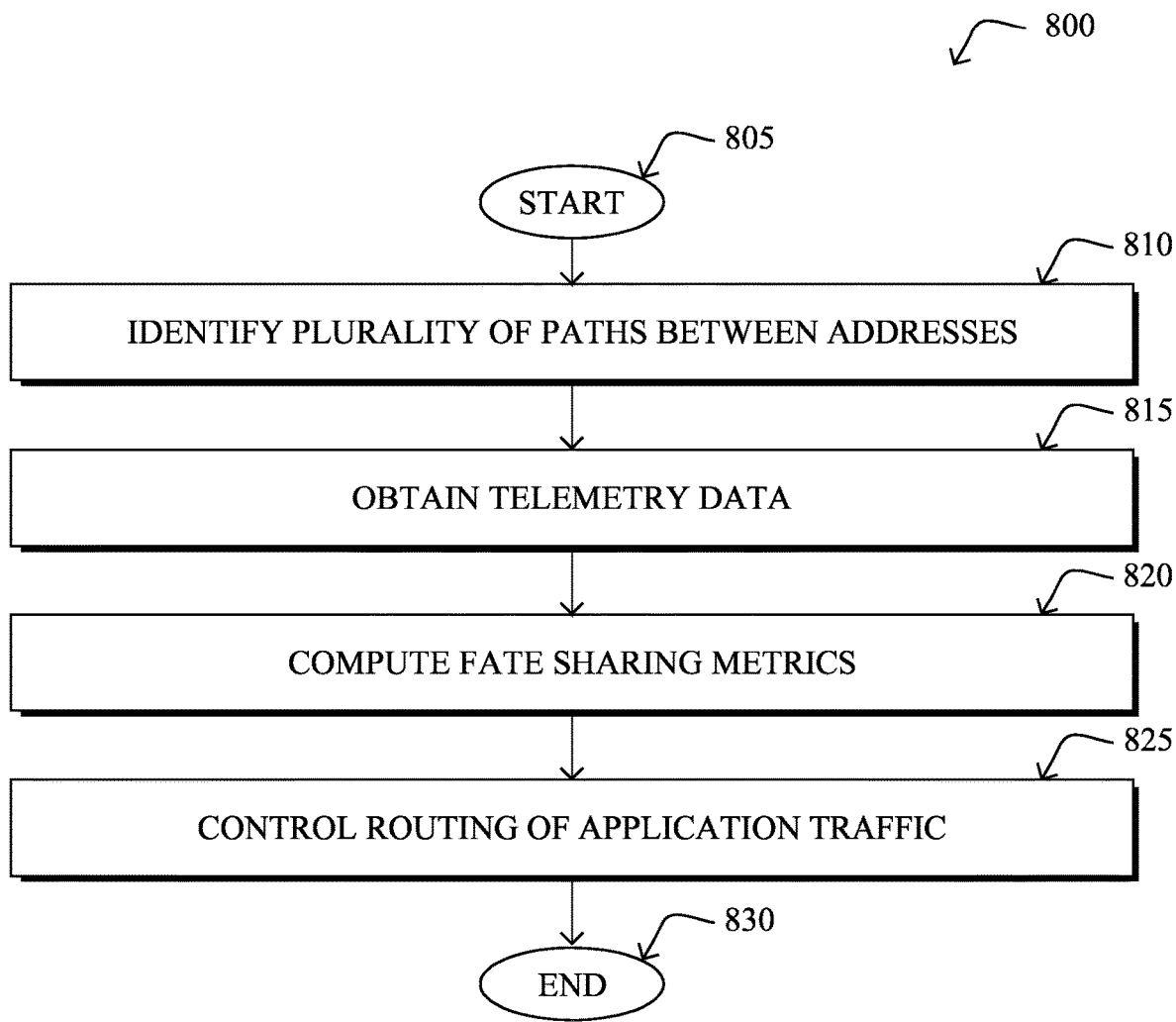
FIG. 8 illustrates an example simplified procedure for routing online application traffic based on fate sharing metrics.

FIG. 8 illustrates an example simplified procedure 800 (e.g., a method) for routing online application traffic based on fate sharing metrics, in accordance with one or more embodiments described herein. For example, a non-generic, specifically configured device (e.g., device 200), such as controller for a network (e.g., an SDN controller, an edge router, or other device in communication therewith) or other supervisory device, may perform procedure 800 by executing stored instructions (e.g., fate sharing detection process 249 and/or predictive routing process 248). The procedure 800 may start at step 805, and continues to step 810, where, as described in greater detail above, the device may identify a plurality of paths between a pair of network addresses, wherein one of the pair of network addresses is associated with an online application. In some embodiments, the online application is a SaaS application. In various embodiments, the device may identify the plurality of paths based in part on the identity of the online application (e.g., the fate sharing mechanisms herein may be applied on a per-application basis), an amount of the application traffic for the online application that the paths convey, combinations thereof, or the like.

At step 815, as detailed above, the device may obtain telemetry data from the plurality of paths for the online application. In various embodiments, the telemetry data may be indicative of one or more of: latency, jitter, or loss. For instance, the device may request probing of the plurality of paths, to measure such path metrics. In other cases, the device may receive the telemetry data from existing telemetry collection mechanisms in the network that already collect path metrics for the plurality of paths.

At step 820, the device may compute, based on the telemetry data, fate sharing metrics for the plurality of paths, as described in greater detail above. In one embodiment, the device may do so by computing correlations between the telemetry data from the plurality of paths for the online application. In one embodiment, the fate sharing metrics may be based on SLA violations indicated by the telemetry data. In other embodiments, the fate sharing metrics may be based on service level agreement violations predicted by a machine learning model from the telemetry data. In some embodiments, the device may also provide an indication of the fate sharing metrics for display. For instance, the device may provide such an indication for display when one or more of the fate sharing metrics crosses a threshold.

At step 825, as detailed above, the device may control routing of application traffic for the online application between the pair of network addresses, based on the fate sharing metrics for the plurality of paths. In one embodiment, the device may do so by causing the application traffic to be load balanced over two or more of the plurality of paths, based on those paths having fate sharing metrics indicating low or no fate sharing among them. Procedure 800 then ends at step 830.

While there have been shown and described illustrative embodiments that provide for routing online application traffic based on fate sharing metrics, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
identifying, by a device, a plurality of paths between a pair of network addresses, wherein one of the pair of network addresses is associated with an online application;
obtaining, by the device, telemetry data from the plurality of paths for the online application;
computing, by the device and based on the telemetry data, fate sharing metrics for the plurality of paths, wherein the fate sharing metrics indicate how likely the plurality of paths are to provide acceptable or unacceptable application experience during any given time period; and
controlling, by the device, routing of application traffic for the online application between the pair of network addresses, based on the fate sharing metrics for the plurality of paths.

2. The method as in claim 1, wherein the telemetry data is indicative of one or more of: latency, jitter, or loss.

3. The method as in claim 1, further comprising:
providing, by the device, an indication of the fate sharing metrics for display.

4. The method as in claim 3, wherein the device provides the indication when one or more of the fate sharing metrics crosses a threshold.

5. The method as in claim 1, wherein controlling routing of application traffic for the online application between the pair of network addresses comprises:
causing the application traffic to be load balanced over two or more of the plurality of paths, based on those paths having fate sharing metrics indicating low or no fate sharing among them.

6. The method as in claim 1, wherein computing the fate sharing metrics comprises:
computing correlations between the telemetry data from the plurality of paths for the online application.

7. The method as in claim 1, wherein the fate sharing metrics are based on service level agreement violations indicated by the telemetry data.

8. The method as in claim 1, wherein the fate sharing metrics are based on service level agreement violations predicted by a machine learning model from the telemetry data.

9. The method as in claim 1, wherein the device identifies the plurality of paths based in part on an amount of the application traffic for the online application that they convey.

10. The method as in claim 1, wherein the online application is a software-as-a-service (SaaS) application.

11. An apparatus, comprising:
one or more network interfaces;
a processor coupled to the one or more network interfaces and configured to execute one or more processes; and
a memory configured to store a process that is executable by the processor, the process when executed configured to:
identify a plurality of paths between a pair of network addresses, wherein one of the pair of network addresses is associated with an online application;
obtain telemetry data from the plurality of paths for the online application;
compute, based on the telemetry data, fate sharing metrics for the plurality of paths, wherein the fate sharing metrics indicate how likely the plurality of paths are to provide acceptable or unacceptable application experience during any given time period; and
control routing of application traffic for the online application between the pair of network addresses, based on the fate sharing metrics for the plurality of paths.

12. The apparatus as in claim 11, wherein the telemetry data is indicative of one or more of: latency, jitter, or loss.

13. The apparatus as in claim 11, wherein the process when executed is further configured to:
provide an indication of the fate sharing metrics for display.

14. The apparatus as in claim 13, wherein the apparatus provides the indication when one or more of the fate sharing metrics crosses a threshold.

15. The apparatus as in claim 11, wherein the apparatus controls routing of application traffic for the online application between the pair of network addresses by:
causing the application traffic to be load balanced over two or more of the plurality of paths, based on those paths having fate sharing metrics indicating low or no fate sharing among them.

16. The apparatus as in claim 11, wherein the apparatus computes the fate sharing metrics by:
computing correlations between the telemetry data from the plurality of paths for the online application.

17. The apparatus as in claim 11, wherein the fate sharing metrics are based on service level agreement violations indicated by the telemetry data.

18. The apparatus as in claim 11, wherein the fate sharing metrics are based on service level agreement violations predicted by a machine learning model from the telemetry data.

19. The apparatus as in claim 11, wherein the apparatus identifies the plurality of paths based in part on an amount of the application traffic for the online application that they convey.

20. A tangible, non-transitory, computer-readable medium storing program instructions that cause a device to execute a process comprising:
identifying, by the device, a plurality of paths between a pair of network addresses, wherein one of the pair of network addresses is associated with an online application;
obtaining, by the device, telemetry data from the plurality of paths for the online application;
computing, by the device and based on the telemetry data, fate sharing metrics for the plurality of paths, wherein the fate sharing metrics indicate how likely the plurality of paths are to provide acceptable or unacceptable application experience during any given time period; and
controlling, by the device, routing of application traffic for the online application between the pair of network addresses, based on the fate sharing metrics for the plurality of paths.

* * * * *

UNITED STATES PATENT AND TRADEMARK OFFICE
CERTIFICATE OF CORRECTION

PATENT NO. : 12,010,017 B2
APPLICATION NO. : 17/533649
DATED : June 11, 2024
INVENTOR(S) : Jean-Philippe Vasseur et al.

It is certified that error appears in the above-identified patent and that said Letters Patent is hereby corrected as shown below:

In the Specification

Column 6, Line 22 please amend as shown:
NN models, etc.), statistical techniques (e.g., Bayesian Column 10, Line 7 please amend as shown:
tion requiring highest throughput, in one embodiment. In Signed and Sealed this
Third Day of September, 2024

Katherine Kelly Vidal
Katherine Kelly Vidal
*Director of the United States Patent and Trademark Office*